(12) United States Patent
Su et al.

(10) Patent No.: US 6,665,436 B2
(45) Date of Patent: *Dec. 16, 2003

(54) METHOD AND SYSTEM FOR AUTOMATICALLY SEGMENTING AND RECOGNIZING HANDWRITTEN CHINESE CHARACTERS

(75) Inventors: Hui Su, Beijing (CN); Donald T. Tang, Beijing (CN); Qian Ying Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/350,244

(22) Filed: Jan. 23, 2003

(65) Prior Publication Data

US 2003/0108239 A1 Jun. 12, 2003

Related U.S. Application Data

(63) Continuation of application No. 09/481,157, filed on Jan. 12, 2000, now Pat. No. 6,519,363.

(30) Foreign Application Priority Data

Jan. 13, 1999 (CN) .......................................... 99100938 A

(51) Int. Cl.[7] ................................................. G06K 9/34
(52) U.S. Cl. ...................... 382/177; 382/186; 382/187; 382/228
(58) Field of Search ................................ 382/178, 177, 382/185, 186, 187, 179, 202, 203, 228, 229, 230

(56) References Cited

U.S. PATENT DOCUMENTS 5,392,363 A   2/1995   Fujisaki et al.

6,519,363 B1 * 2/2003 Su et al. ..................... 382/177

FOREIGN PATENT DOCUMENTS

| JP | 06-124364 | 5/1994 |
| JP | 07-28949 | 1/1995 |
| JP | 08-180142 | 7/1996 |
| JP | 09-054814 | 2/1997 |
| JP | 10-240867 | 9/1998 |

OTHER PUBLICATIONS

C. Hong et al., "Segmentation and Recognition of Continuous Handwriting Chinese Text," International Journal of Pattern Recognition and Artificial Intelligence, vol. 12, No. 2, pp. 223–232, 1998.

* cited by examiner

Primary Examiner—Phuoc Tran
(74) Attorney, Agent, or Firm—Thu Ann Dang

(57) ABSTRACT

This invention discloses a method for automatically segmenting and recognizing Chinese character strings continuously written by a user in a handwritten Chinese character processing system, comprising the steps of: creating a geometry model and a language mode; finding out all of potential segmentation schemes in the Chinese character strings continuously written by a user based on the associated timing information and said geometry model; recognizing the groups of strokes as defined by each of potential segmentation schemes and computing the probability characterizing the exactness of recognition results; correcting the probability characterizing the exactness of recognition results by said language model; and, selecting the recognition result and the corresponding segmentation scheme having the maximum probability value.

13 Claims, 3 Drawing Sheets

PATH SCORE = $P_{LM} P_D \cdot P_R P_{GAP}$

METHOD AND SYSTEM FOR AUTOMATICALLY SEGMENTING AND RECOGNIZING HANDWRITTEN CHINESE CHARACTERS

CROSS-REFERENCE TO RELATED APPLICATIONS

This application is a continuation of U.S. application Ser. No. 09/481,157, filed Jan. 12, 2000, now Pat. No. 6,519,363 which is incorporated by reference herein.

The present invention relates to the technique of automatically recognizing handwritten Chinese characters, particularly relates to a method and system for automatically segmenting and recognizing Chinese character strings continuously written by a user.

The current information processing systems for accepting a user's handwriting character input normally comprise a pen-based input means, which is composed of a writing pen and a writing pad. Such a pen-based input means requires that when a user finishes the writing of a Chinese character, he should click a button on the writing pen or writing pad so as to manually segment the handwritten Chinese character strings. The automatic handwritten Chinese characters recognition device can directly recognize the manually segmented Chinese character strings. However, the manual segmentation process affects the user's handwriting continuity. Therefore, this handwriting mode is not adapted to the user's handwriting habit.

IBM's ThinkScribe is a device integrating a handwriting digitizer with a traditional paper-based recording system. This device records a user's handwriting input in strokes and associated time sequence and can reproduce the user's handwriting input according to the original time sequence. When users write Chinese characters on ThinkScribe, they usually write characters continuously with little or without any space in-between characters. And sometimes, users even overlap strokes of adjacent characters or connect the last stroke of the preceding character with the first stroke of the latter character. This makes the character segmentation a problem before recognition.

At present, there are no effective character segmentation methods. The handwritten Chinese character recognition technique can only recognize isolated Chinese characters or handwritten Chinese character strings with big spaces. The difficulties of automatically segmenting handwritten Chinese character strings lie in:

1) Many Chinese characters have separable components lined up from left to right. When writing quickly in a horizontal line from left to right, the distance between such components may be similar to that between two characters. In addition to this spatial confusion, the left and right parts of those characters are often themselves single characters, or may resemble some characters. Similar statements can be made for Chinese characters written in a vertical line, since many Chinese characters have separable components stacked up from top to down.
2) For adjacent characters, when writing cursively, the end stroke of the first character and the beginning stroke of the second character may not be cleanly separated with each other.

Thus, how to overcome the above difficulties and provide a method for automatically segmenting Chinese character string continuously written by a user are the bases for realizing the automatic recognition of the continuously handwritten Chinese character string.

The method according to the present invention for automatically segmenting and recognizing handwritten Chinese character strings takes advantage of the information derived from different sources to realize the automatic segmentation and recognition of continuously handwritten Chinese character, such as writing habits, geometric characteristics of Chinese character strings, time sequence information and language model at different levels.

The method according to the present invention for automatically segmenting and recognizing handwritten Chinese character strings comprises the following steps:

creating a geometry model which describes the geometric characteristics of stroke sequences of handwritten Chinese character strings and a language model which describes the dependency among Chinese characters or words;

finding out all of potential segmentation schemes in Chinese character strings continuously written by a user based on said associated timing information and said geometry model;

recognizing the groups of strokes as defined by each of potential segmentation schemes and computing the probability characterizing the exactness of the recognition result;

correcting the probability characterizing the exactness of the recognition result by said language model; and selecting the recognition result having the maximum probability value and the corresponding segmentation scheme as the segmentation and recognition result of the Chinese character strings continuously written by a user.

The system according to the present invention for automatically segmenting and recognizing handwritten Chinese character strings comprises:

input means, for accepting Chinese character strings continuously written by a user, and recording the user input in strokes and the associated timing information;

model storage means, for storing a geometry model which describes the geometric characteristics of stroke sequences in handwritten Chinese character strings and a language model which describes the dependency among Chinese characters or words;

segmenting means, for finding out all of potential segmentation schemes in the Chinese character strings continuously written by a user based on said associated timing information and said geometry model;

recognizing means, for recognizing the groups of strokes as defined by each of potential segmentation schemes and computing the probability characterizing the exactness of the recognition result; and arbitrating means, for correcting the probability characterizing the exactness of the recognition result by said language model; and selecting the recognition result and the corresponding segmentation scheme having the maximum probability value as the segmentation and recognition result of the Chinese character strings continuously written by a user.

The following descriptions in connection with the accompanying drawings make the objects, features and advantages of the invention more clear.

Figure 1:
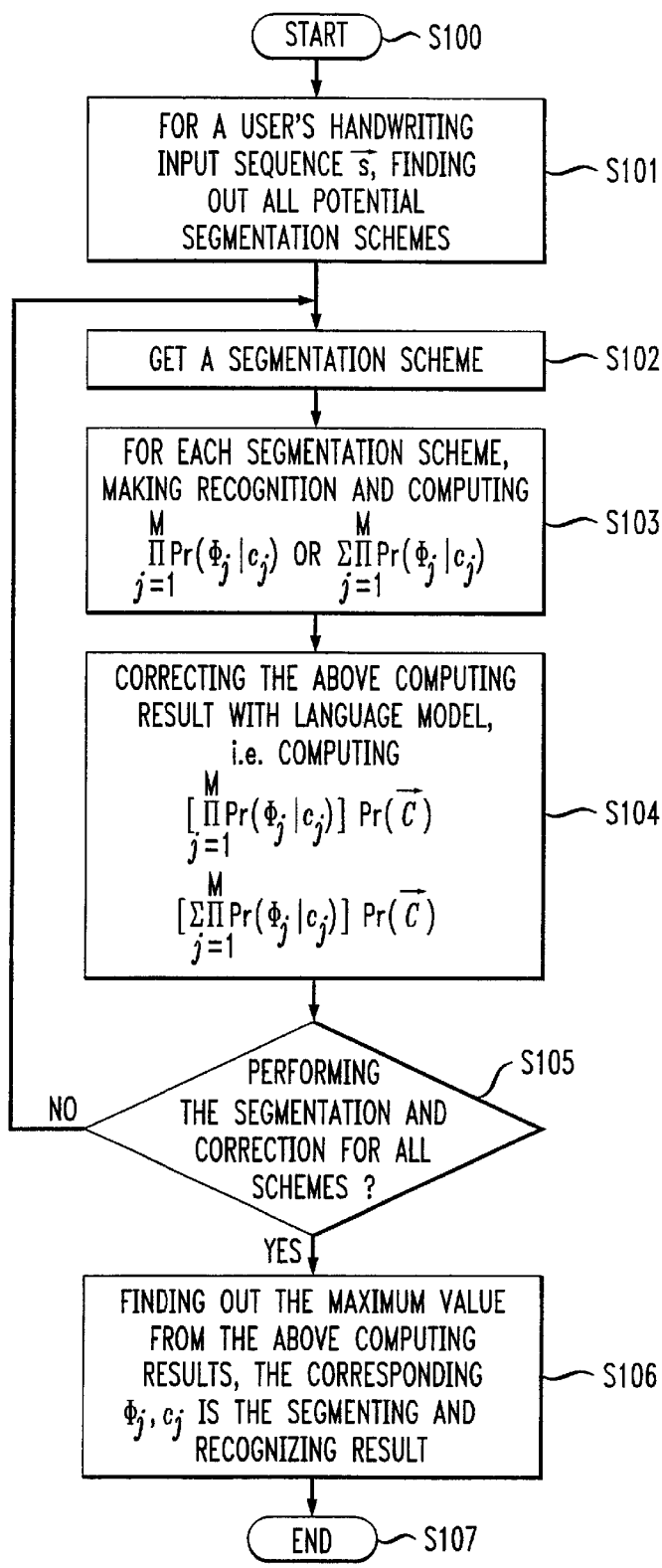
FIG. 1 is a concept flow chart illustrating the method according to the present invention for automatically segmenting and recognizing handwritten Chinese character strings.

The method according to the present invention for automatically segmenting and recognizing handwritten Chinese character strings can be described by the following formula:

$$\vec{C}^* = \arg\max P_r(\vec{C}|\vec{S}) \qquad (1)$$

The goal in recognition is to retrieve a character sequence $\vec{C}^*$ which is as close as possible to the actual character sequence $\vec{C}$ written by the user. In a probabilistic setting, this is achieved by minimizing the probability of recognition error. Recognition therefore amounts to computing the character sequence $\vec{C}^*$ which has the maximum a posteriori probability given the input handwriting sequence $\vec{S}$. Using Bayes rule, Equation (1) is rewritten to be as:

$$\vec{C}^* = \arg\max_{\vec{C}} P_r(\vec{S}|\vec{C})P_r(\vec{C}) \qquad (2)$$

In Equation (2), the term $P_r(\vec{C})$ is the source model, i.e., it characterizes the possible sequence of characters in the language considered. This could include Chinese words, etc. The probability measure $P_r(\vec{C})$ can be obtained through a language model, which may vary in complexity from a simple dictionary to more sophisticated statistical language models based on (character or word) n-grams. $P_r(\vec{S}|\vec{C})$ characterizes all scribble sequences which can be generated for each intended sequence $\vec{C}$. Let the scribble sequence $\vec{S} = f_1, f_2, \ldots, f_N$, where $f_i$ is a scribble unit (unit of scribble can be part of stroke or group of strokes or radical). Similarly, let the character sequence ($\vec{S} = c_1, c_2, \ldots, c_M$), $\vec{C} = C_1, C_2, \ldots, c_M$, where each $c_i$ is an individual character. In general, each such character can be associated with a block of units delimited by two boundary points. Namely, there exist M+1 boundary points $\{b_j\}, 0 \leq j \leq M$, such that: (i) $b_o=0$ and $b_M=1$; and (ii) each unit $f_n$ such that $b_{j-1}+1 \leq n \leq b_j$ is associated with $c_j$. In the case of discretely written data, the boundary points $\{b_j\}$ are uniquely determined, since each character is written in isolation. In this case, $P_r(\vec{S}|\vec{C})$ is expressed by:

$$P_r(\vec{S}|\vec{C}) = \prod_{j=1}^{M} P_r(\Phi_j | c_j) \qquad (3)$$

where $\Phi j = f_{b_{j-1}+1} \ldots f_{b_j}$ represents a block of units associated with the character $c_j$. In the case of connected or unconstrained handwriting, however, the boundary points $\{b_j\}$ are, in general, arbitrary. In that case $P_r(\vec{S}|\vec{C})$ is expressed by:

$$P_r(\vec{S}|\vec{C}) = \sum \prod_{j=1}^{M} P_r(\Phi_j | c_j) \qquad (4)$$

where $\Phi j$ assumes the same definition as before for a given set of boundary points. The summation in Equation (4) is taken over all possible segmentation of the unit sequence into M segments for each hypothesis considered. Then, i) the discrete recognition model can be shown as:

$$\vec{C}^* = \arg\max\left\{\left[\prod_{j=1}^{M} P_r(\Phi_j | c_j)\right] P_r(\vec{C})\right\} \qquad (5)$$

ii) the indiscrete recognition model can be shown as:

$$\vec{C}^* = \arg\max\left\{\left[\sum \prod_{j=1}^{M} P_r(\Phi_j | c_j)\right] P_r(\vec{C})\right\} \qquad (6)$$

It can be seen from the above analysis that the handwritten Chinese character recognition is the combination of segmentation and recognition.

FIG. 1 shows the concrete steps of the method according to the present invention for automatically segmenting and recognizing handwritten Chinese character strings obtained from the above analysis. As shown in FIG. 1:

Step S101: for a user's handwriting input sequence S, finding out all potential segmentation schemes $\vec{B}$ 1:1=1 ... N Step S103: for each segmentation scheme, making recognition and computing $$\prod_{j=1}^{M} P_r(\Phi_j | c_j) \text{ or } \sum \prod_{j=1}^{M} P_r(\Phi_j | c_j);$$

Step S104: correcting the above computing result with language model, i.e., computing $$\left[\prod_{j=1}^{M} P_r(\Phi_j | c_j)\right] P_r(\vec{C}) \text{ or } \left[\sum \prod_{j=1}^{M} P_r(\Phi_j | c_j)\right] P_r(\vec{C});$$

and

Step S106: finding out the maximum value from the above computing results, the $\Phi_j$ and $c_j$ (J=1 ... M) corresponding to said value being the segmenting and recognizing result of the user's handwriting Chinese character input sequence $\vec{S}$.

It can be seen from the above that for the method according to the present invention for automatically segmenting and recognizing handwritten Chinese character strings, the recognition is completed at the same time when the segmentation is completed.

In fact, the current methods for recognizing handwritten Chinese characters are all implemented in a way: computing $P_r(\Phi_j|c_j)$ from a large amount of samples, taking $c_j$ corresponding to the maximum value $P_r(\Phi_j|c_j)$ as the recognizing result of $\Phi_j$. Consequently, the method according to the present invention for automatically segmenting and recognizing handwritten Chinese character strings can make use of the existing recognition engines to compute $$\prod_{j=1}^{M} P_r(\Phi_j | c_j) \text{ or } \sum \prod_{j=1}^{M} P_r(\Phi_j | c_j);$$

for every potential segmentation scheme. Correcting the above results with the language model $P_r(\vec{C})$ and finding out the maximum value from the computing results corresponding to each segmentation scheme. The $\Phi_j$ and $C_j$ (j=1 ... M) corresponding to the maximum value is the segmenting and recognizing result of the user's handwriting input sequence $\vec{S}$.

In the above method, usually, $\Phi_j$ is considered to be strokes and $c_j$ is regarded as isolated Chinese characters. But, $c_j$ can be the components of a Chinese character, such as the radicals of a Chinese character. Meanwhile, $c_j$ can also be a word. Thus, those Chinese character strings containing overlapped strokes and being not able to be automatically segmented can be recognized together. In such a case, the current recognition engine can not be used. Then $P_r(\Phi_j | c_j)$ can be calculated through a training procedure with handwritten Chinese character strings. These strings include single character.

The following takes the handwritten Chinese character string data recorded by IBM's ThinkScribe as examples, describing in details the method according to the present invention for automatically segmenting handwritten Chinese character strings.

We make the following assumptions on Chinese handwriting for automatic segmentation:

(1) Each Chinese character consists of a number of handwritten scribbled strokes. Although some scribbled strokes may not correspond to the strokes of a printed character, a character always ends only at the end of a certain scribbled stroke. That is, this boundary detection method does not consider the rare case in which the last scribbled stroke of the previous character is connected to the first stroke of the next character. If the rare case occurs, the user can initiate a manual procedure to indicate the segmentation boundary by breaking the connecting stroke.

(2) Characters are written in sequence. That is, the previous character is always completely written before the next character is started.

(3) The characters string consists of characters written in a line from left to right. The segmentation scheme may be modified easily for character strings written in a line from top down.

(4) A device such as ThinkScribe will capture handwritten strokes information for Chinese characters. Each scribbled stroke is characterized by a sequence of discrete stroke points characterized by x and y coordinate and timing values. The ith scribbled stroke thus may be expressed as $$s(i)=(x(i,1),y(i,1),t(i,1)), \ldots ,(x(i,j),y(i,j), t(i,j)), \ldots ,(x(i,e(i)),y(i,e(i)), t(i,e(i)))$$

where e(i) is the number of stroke points in stroke i. The observed stroke sequence is then:

$$s(1),s(2), \ldots s(i), \ldots$$

where s(1) is the first stroke belonging to the unsegmented characters.

We observe that a clear criterion for character segmentation is the physical separation between two adjacent characters. When writing from left to right, such a separation can be described by a vertical gap of width G between two adjacent strokes. One may thus use the following condition at each starting point of a stroke s(K) for testing such a gap:

$$\underset{\text{For all points with } t(i,j)<t(K,1)}{\text{Max}} (x(i,j)) \le \underset{\text{For all points with } t(i,j)\ge t(K,1)}{\text{Min}} (x(i,j)) - G \quad (7)$$

Note that the observation for evaluating the right side of Equation (7) consists of all points. In practice, we may terminate our observation at a point when one begins to write in a region which is sufficiently distant from the last established character boundary. Thus a condition "for all strokes containing some point with x(i,j)<x(1,1)+D may be used to bound the observation. Here D is an upper bound of G which can be determined empirically (e. g., it may be set to be the line width, or 1.5 times the maximum distance between character boundaries determined so far). We now define f(G) to be a monotone function of G which is the cumulative probability function for stroke s(K) to be the starting stroke of a character, given the character sequence C. Note that this function can be derived from the analysis of collected handwriting data from many typical users, and can also be trained for a particular user. In theory, it can be context dependent. In practice, however, since writing habits of people may not be always very stable, an approximate function may be preferred, especially in a user-independent mode.

Since Equation.(7) is used for characterizing a vertical gap which distinguishes a horizontally separated stroke. In general, such a vertical gap may not always exist even when a stroke is disjoint and separated horizontally from earlier strokes. We may use a different criterion for defining such a horizontal separation:

$$\underset{\substack{\text{For all points with } t(i,j)<t(K,1) \\ \text{for } y(i,j)=\text{each } Y \text{ value}}}{\text{Max}} (x(i, j)) \le \underset{\substack{\text{For all points with } t(i,j)\ge t(K,1) \\ \text{for } y(i,j)=\text{each } Y \text{ value}}}{\text{Min}} (x(i, j)) - G \quad (8)$$

Now since the strokes are not continuously defined but represented by discrete stroke points, Equation(8) is further modified so that the equation holds not for all y(j) values, but for horizontal strips of certain thickness T. Here T is selected as a function of stroke point statistics so that if a stoke crosses a horizontal strip, some stroke point will appear in the strip. We have $$\underset{\substack{\text{For all points with } t(i,j)<t(K,1) \\ \text{for } nT\le y(I,j)\le (n+1)T}}{\text{Max}} (x(i, j)) \le \underset{\substack{\text{For all points with } t(i,j)\ge t(K,1) \\ \text{for } nT\le y(i,j)\le (n+1)T}}{\text{Min}} (x(i, j)) - G \quad (9)$$

Here nT ranges from the lowest to the highest expected y coordinate values of the character string. The cumulative probability function f(G) for a given character sequence C defined earlier applies the same way here.

With the vertical gap or horizontal separation detected between strokes, a set of potential boundary stroke points are identified. We can thus rewrite Equation (2) as:

$$\vec{C}^* = \arg \max P_r(\vec{S}|\vec{B})P_r(\vec{B}|\vec{C})P_r(\vec{C}) \quad (10)$$

where the maximum is taken over all $\vec{B}$ ($\{b_j\}$, ($0 \le j \le M$)), i.e., all possible character boundary sequences obtained from taking all subsets of potential boundary stroke points. The term $P_r(\vec{B}|\vec{C})$ represents the combined probability of single character recognition results. Thus $$P_r(\vec{B}|\vec{C}) = \prod_{j=1}^{M} P_r(\Phi_j | c_j) \quad (11)$$

The first factor $P_r(\vec{S}|\vec{B})$ in Equation (10) is the most significant factor which captures the probabilistic parameters from observed stroke geometry. We first write $$P_r(\vec{S}|\vec{B}) = P_r(\vec{B}|\vec{S})P_r(\vec{S})/P_r(\vec{B}) \quad (12)$$

and since there is no inherent probabilistic difference among different $\vec{B}$, $P_r(\vec{B})$ is taken to the uniform. Also, $P_r(\vec{S})$ is constant with a given $\vec{S}$. Therefore, $$P_r(\vec{S}|\vec{B}) \propto P_r(\vec{B}|\vec{S}) \quad (13)$$

$P_r(\vec{B}|\vec{S})$ which is the geometry model can be derived from two sources of information via observed stroke geometry. One is the gap (or horizontal separation) model associated with $\vec{B}$, and the other is the character stroke model of different candidate characters associated with $\vec{B}$. We thus have $$P_r(\vec{B}|\vec{S}) = P_r^{(g)}(\vec{B}|\vec{S}) \times P_r^{(d)}(\vec{B}|\vec{S}) \quad (14)$$

In theory, both $P_r^{(g)}$ and $P_r^{(d)}$ can be viewed as context dependent, i.e., can be functions of $\vec{C}$. However, dependency of $P_r^{(g)}$ on $\vec{C}$ is seen to be very weak, and $P_r^{(g)}$ may be calculated from independent gap models:

$$P_r^{(g)}(\vec{B}|\vec{S}) = \prod_i f_i(G) \prod_j (1 - f_j(G)) \quad (15)$$

where i ranges over potential boundaries in $\vec{B}$ and j ranges over potential boundaries not in $\vec{B}$.

As to the character stroke model, $P_r^{(d)}$ may be calculated in different ways, depending on the strategy one takes with respect to the trade-offs among performance parameters such as complexity, reliability, and accuracy gain. Generally speaking, we assume that an x-direction stroke density distribution may be established from writing samples for each characters. They can also be normalized with respect to the average size. When a particular $\vec{C}$ is considered with a given $\vec{S}$, we can calculated, for each $c_i$ in $\vec{C}$, the individual x-direction stroke density distribution, and compare it with the stored typical distribution, and derive a probability for matching likelihood. Approximation by taking into account of only the x-direction span of a candidate character, for instance, may be good enough for practical purposes. With this approach, for each character, a normalized probability distribution of x-direction span is first derived from collected writing samples and is stored. The observed x-direction span of each thus gives a likelihood probability figure. Then product gives:

$$P_r^{(d)}(\vec{B}|\vec{S}) = \prod_i m_i \quad (16)$$

where $m_i$ denotes the likelihood probability of candidate character $c_i$ given by the character stroke model. In practice, $m_i$ will become zero when the x-direction span, for instance, becomes excessively large, say $\geq D$.

The factor $P_r(\vec{C})$ is calculated from the language model of a character string. Since the Chinese language is strongly word based linguistically, a word level language model should be used. That means for each character string, we will perform word segmentation and use word frequencies and possibly higher order n-grams to evaluate $P_r(\vec{C})$. In practice, we may simply use the word level unigram probabilities and multiply them together. For a truncated character string, same single character words may appear at the end of the string after word segmentation. Such truncation effects should be taken into consideration in the sequential decision process for character segmentation and recognition.

We note that it's possible for the geometry model $P_r(\vec{B}|\vec{S})$, which is based on observed stroke geometry, to dominate the calculation of Equation (10). This happens, for instance, when one writes with large gaps between characters so that $P_r^{(g)}(\vec{B}|\vec{S})$ is large ($\approx 1$) for a particular $\vec{C}$, and $<<1$ for all others. In such cases, clearly Equation (15) alone can be used for character segmentation without involving character recognition and language model in the process.

Both the gap model and the character stroke model used in Equation (14) are statistic model based on collected handwriting samples.

It can be seen from the above analysis that the automatic segmentation and recognition method according to the present invention takes into consideration of the geometric characteristics of the strokes when trying to locate the potential boundary point. Concretely speaking, the gap model G and distribution model D have been employed. G model characterizes the probability of the later stroke of two adjacent strokes being a potential boundary according to the gap between the two adjacent strokes. Said two adjacent strokes are referred as a former one and a later one with respect to said associated timing information. Furthermore, the G model is monotone ascending function, wherein the argument of said function is the gap between said two adjacent strokes and the dependent variable of said function characterizes the probability of the later stroke being a potential boundary.

In addition, the geometric model also comprises distribution model D, which characterizes the probability of the strokes between the current stroke and the last confirmed potential character boundary point constructing a Chinese character based on the distance between the current stroke and the last stroke confirmed as a potential character boundary point.

Furthermore, the D model can be a normal-like distribution function, wherein the argument of said function is the distance between the current stroke and the last confirmed potential character boundary point and the dependent variable of said function characterizes the probability of the strokes between the current stroke and the last confirmed potential character boundary point constructing a Chinese character, when the argument varies within a continuous value range, the value of said normal-like function is larger, otherwise smaller.

Figure 2:
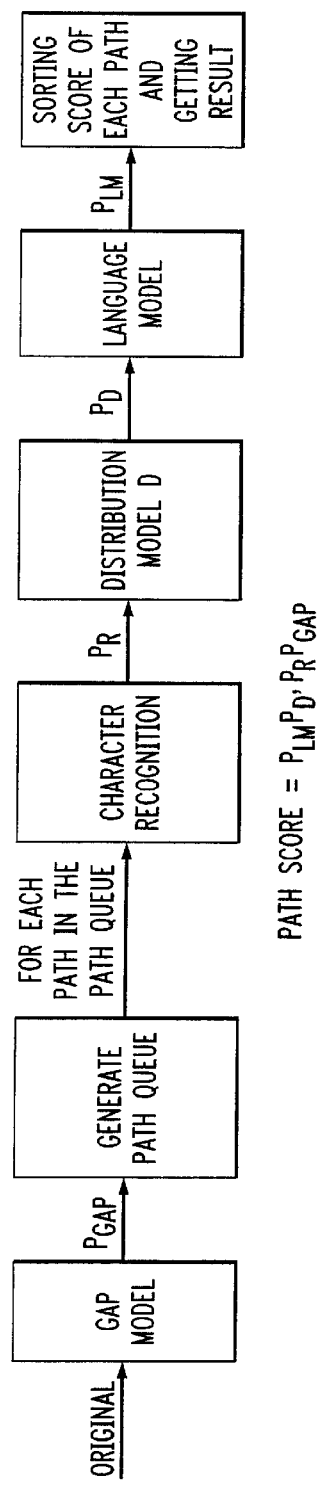
FIG. 2 is a flow chart illustrating the method according to a first embodiment of the present invention for automatically segmenting and recognizing handwritten Chinese character strings.

FIG. 2 illustrates the concrete steps of the method according to a first embodiment of the present invention for automatically segmenting and recognizing handwritten Chinese character strings.

First of all, a user's handwritten Chinese character strings $\vec{S}$ are analyzed through gap model G to determine all the potential character boundary points. A path is generated for each potential segmentation scheme and all the paths are stored in queue. Then, each path in the queue is recognized. Furthermore, distribution model D and language model $P_{LM}$ are used to correct $P_{gap} \cdot P_R$, i.e., calculating $P_{LM} \cdot P_D \cdot P_R \cdot P_{gap}$. The path with the highest score after sorting can be obtained. The segmentation scheme and recognition result corresponding to the path with the highest score is the segmentation and recognition result of the handwritten Chinese character strings $\vec{S}$.

Figure 3:
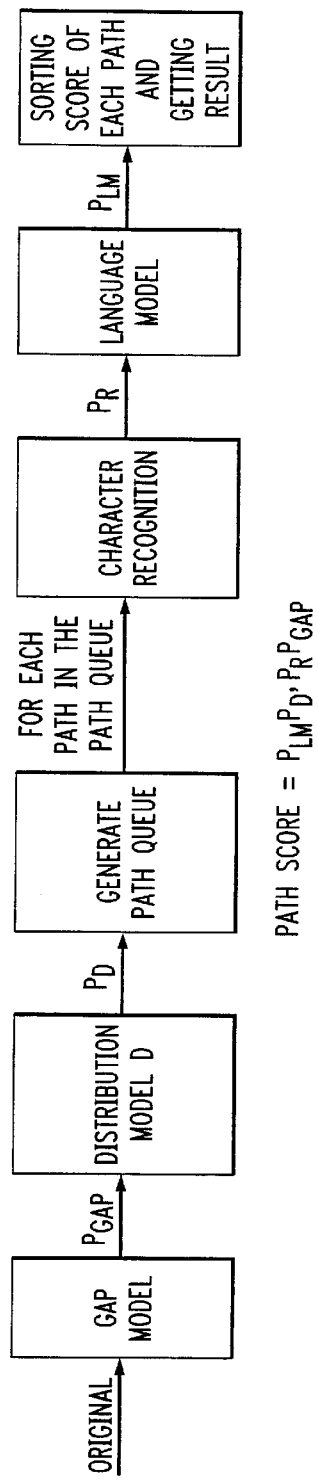
FIG. 3 is a flow chart illustrating the method according to a second embodiment of the present invention for automatically segmenting and recognizing handwritten Chinese character strings.

FIG. 3 illustrates the concrete steps of the method according to another embodiment of the present invention for automatically segmenting and recognizing handwritten Chinese character strings. The potential boundary points of handwritten Chinese character strings $\vec{S}$ are determined after being analyzed through G model and D model. This is helpful to reduce the number of the paths and to enhance the segmentation and recognition efficiency.

Figure 4:
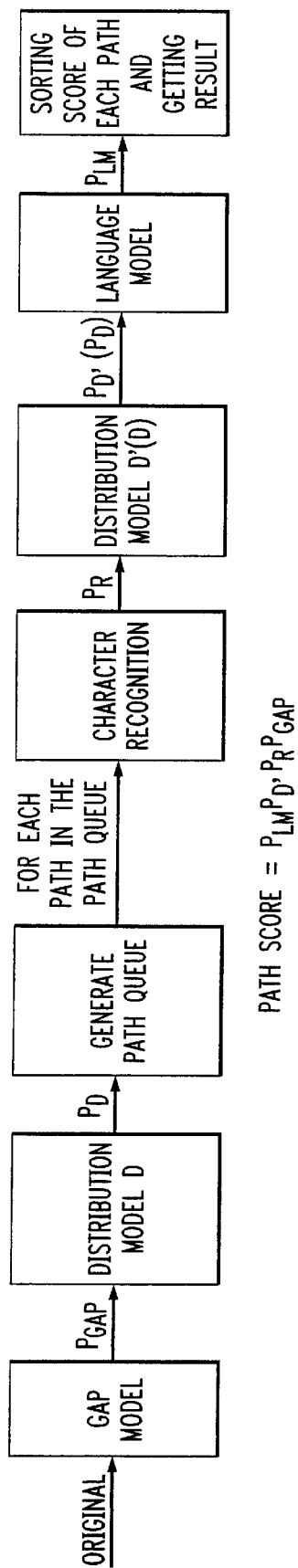
FIG. 4 is a flow chart illustrating the method according to a third embodiment of the present invention for automatically segmenting and recognizing handwritten Chinese character strings.

FIG. 4 illustrates the concrete steps of the method according to a third embodiment of the present invention for automatically segmenting and recognizing handwritten Chinese character strings. The recognition result is corrected through distribution model D' so as to raise the exactness of the segmentation and recognition. When the writing direction is horizontal, and the recognition result is a Chinese character having separable components lined up from left to right, a character width model D' can be used to correct the probability characterizing exactness of the recognition results, model D' characterizes the probability of a component constructing a part of a Chinese character or a Chinese character based on the width of the component. When the writing direction is vertical and the recognition result is a Chinese character having separable components stacked up from top to down, a character height model D' can be used to correct the probability characterizing exactness of the recognition result, model D' characterizes the probability of a component constructing a part of a Chinese character or a Chinese character based on the height of the component.

In addition, as discussed above, the recognition results can be radical, single character or multi-characters word.

When concretely implementing the method according to the present invention for automatically segmenting and recognizing handwritten Chinese character strings, a tree-structure can be used so as to efficiently represent paths. Each of the paths represents a segmentation scheme.

The automatic segmentation and recognition of handwritten Chinese character strings with a tree-structure comprises the following steps:

Step (1): From the analysis of samples of handwritten data, construct f(G) and f(D).

Step (2): Calculate G for each stroke. If G is greater than 0, the stroke is a potential boundary point.

Step (3): Starting from the last confirmed character boundary as the root, grow a binary tree representing potential segmentation schemes. The left branch represents that the previous potential boundary is not accepted, the right branch represents that the previous potential boundary is accepted. And, whenever a potential character boundary is generated, a branch creates down. Each path from the root to leaf point represents a potential segmentation scheme. Then, the score of each path can be obtained via Equation (10). However, in practice, when the tree grows down, the f(G) and recognition results are used to evaluate the probability of the existence of the branches corresponding to each new branch so as to prune the tree.

Step (4): If at any potential boundary point f(G)=1, then the left branch may be pruned. This happens when the large physical separation assures the existence of a character boundary.

Step (5): If the value of a particular likelihood probability $m_i$ falls to zero, then the last left branch may be pruned.

Step (6): If the probability of the character recognition result suddenly falls below a predetermined threshold L due to the inclusion of the last potential boundary point, then this left branch may be pruned. L is a probability bound obtainable by experience and can be tuned.

Step (7): Evaluation is made via Equation (10) for all each of the remaining branch.

The above in connection with the drawings describes in details the method according to the present invention for automatically segmenting and recognizing handwritten Chinese character strings.

Figure 5:
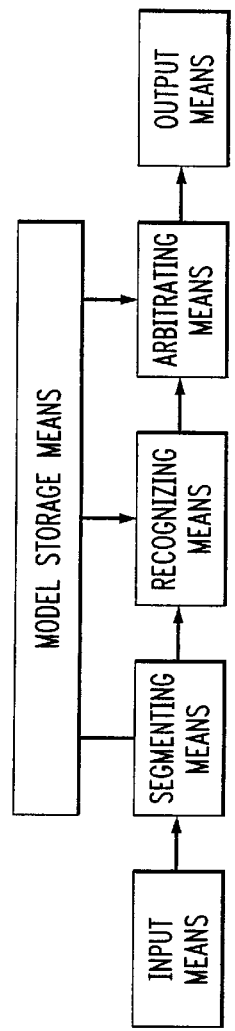
FIG. 5 is a block chart illustrating the system according to the present invention for automatically segmenting and recognizing handwritten Chinese character strings.

The following in connection with FIG. 5 describes a system for using the method of the present invention.

As shown in FIG. 5, the system according to the present invention for automatically segmenting and recognizing handwritten Chinese character strings comprises:

input means, for accepting Chinese character strings continuously written by a user, and recording the user input in strokes and the associated timing information;

model storage means, for storing a geometry model which describes the geometric characteristics of stroke sequences in handwritten Chinese character strings and a language model which describes the dependency among Chinese characters or words;

segmenting means, for finding out all of potential segmentation schemes in the Chinese character strings continuously written by a user based on said associated timing information and said geometry model;

recognizing means, for recognizing the groups of strokes as defined by each of potential segmentation schemes and computing the probability characterizing the exactness of the recognition result; and arbitrating means, for correcting the probability characterizing the exactness of the recognition result by said language model; and selecting the recognition result and the corresponding segmentation scheme having the maximum probability value as the segmentation and recognition result of the Chinese character strings continuously written by a user.

The input means can be, for example, IBM's ThinkScribe. IBM's ThinkScribe is a device integrating a handwriting digitizer with a traditional paper-based recording system. This device records a user's handwriting input in strokes and associated timing sequence and can reproduce the user's handwriting input according to the original timing sequence. ThinkScribe can store the data stream S(1), S(2), S(3) . . . in its nonvolatile memory and can send it to, for example, a personal computer (PC) through input/output port when necessary. The PC may include a processor, associated memory and input/output devices for implementing one or more of the segmenting, recognizing, model storage, arbitrating and output means shown in FIG. 5. The PC can run the handwriting input regeneration programs of ThinkScribe to reproduce a user's handwriting input according to the original timing sequence. When a recognition means is mounted in PC, PC can also be used as a recognition engine to recognize a user's handwriting input. Of course the invention may be implemented in accordance with one or more other processor-based devices which comprise a processor, associated memory and input/output devices.

The above in connection with the accompanying drawings describes a method according to the present invention for automatically segmenting and recognizing Chinese character strings continuously input by a user and a system for using the method in the handwritten Chinese characters information processing systems. As understood by a person skilled in the art, the present invention is not limited to the above examples. Under the premise that the spirit and scope of the present invention are not violated, various amendments and changes can be made to the present invention. The present invention aims at including all these amendments and changes. The protection scope of the present invention is defined in the attached claims.

What is claimed is:

1. A method for automatically segmenting and recognizing character strings continuously written by a user in a handwritten character processing system, wherein said handwritten character processing system records character strings continuously written by a user in strokes and associated timing information thereof, said method comprising the steps of:

creating a geometry model which describes geometric characteristics of stroke sequences of handwritten character strings and a language model which describes dependency among characters or words;

determining potential segmentation schemes in the character strings continuously written by a user based on said associated timing information and said geometry model;

recognizing groups of strokes as defined by each of the potential segmentation schemes and computing a probability characterizing the exactness of the recognition result;

correcting the probability characterizing the exactness of the recognition result by said language model; and selecting the recognition result having the maximum probability value and the corresponding segmentation scheme as the segmentation and recognition result of the character strings continuously written by a user.

2. A method for automatically segmenting and recognizing handwritten character strings according to claim 1, wherein said geometry model comprises a gap model G, which characterizes the probability of the later stroke of two adjacent strokes being a potential boundary based on the gap between said two adjacent strokes, said two adjacent strokes referred as a former one and a later one with respect to said associated timing information.

3. A method for automatically segmenting and recognizing handwritten character strings according to claim 2, wherein said model G is a monotone ascending function, wherein the argument of said function is the gap between said two adjacent strokes and the dependent variable of said function characterizes the probability of the later stroke being a potential boundary.

4. A method for automatically segmenting and recognizing handwritten character strings according to claim 1, wherein said geometry model comprises a distribution model D, which characterizes the probability of the strokes between the current stroke and the last confirmed potential character boundary constructing a character based on the distance between the current stroke and the last confirmed character boundary.

5. A method for automatically segmenting and recognizing handwritten character strings according to claim 4, wherein said model D is a normal-like distribution function, wherein the argument of said function is the distance between the current stroke and the last confirmed potential character boundary and the dependent variable of said function characterizes the probability of the strokes between the current stroke and the last confirmed potential character boundary constructing a character, when the argument varies within a continuous value range, the value of said normal-like function is larger, otherwise smaller.

6. A method for automatically segmenting and recognizing handwritten character strings according to claim 1, wherein the recognition results of the strokes between two adjacent character boundaries can be radical, single character or multi-characters word.

7. A method for automatically segmenting and recognizing handwritten character strings according to claim 1, wherein when the writing direction is horizontal and the recognition result is a character having separable components lined up from left to right, a character width model D' can be used to correct the probability characterizing exactness of the recognition results, model D' characterizes the probability of a component constructing a part of a character or a character based on the width of the component.

8. A method for automatically segmenting and recognizing handwritten character strings according to claim 1, wherein when the writing direction is vertical and the recognition result is a character having separable components stacked up from top to down, a character height model D' can be used to correct the probability characterizing exactness of the recognition result, model D' characterizes the probability of a component constructing a part of a character or a character based on the height of the component.

9. A method for automatically segmenting and recognizing handwritten character strings according to claim 1, wherein a tree is used for searching the potential segmentation schemes.

10. A method for automatically segmenting and recognizing handwritten character strings according to claim 9, wherein said tree is a binary tree, wherein the root represents the last confirmed character boundary, the left branch represents that the previous potential boundary is not accepted, the right branch represents that the previous potential boundary is accepted, and whenever a potential character boundary is generated, the tree creates a branch down.

11. A method for automatically segmenting and recognizing handwritten character strings according to claim 10, wherein said binary tree may be pruned in accordance with a gap model G, a distribution model D and the recognition results.

12. A system for automatically segmenting and recognizing handwritten character strings, comprising:

input means, for accepting character strings continuously written by a user, and recording the user input in strokes and the associated timing information;

model storage means, for storing a geometry model which describes geometric characteristics of stroke sequences in handwritten character strings and a language model which describes dependency among characters or words;

segmenting means, for determining potential segmentation schemes in the character strings continuously written by a user based on said associated timing information and said geometry model;

recognizing means, for recognizing groups of strokes as defined by each of the potential segmentation schemes and computing a probability characterizing the exactness of the recognition result; and arbitrating means, for correcting the probability characterizing the exactness of the recognition result by said language model; and selecting the recognition result and the corresponding segmentation scheme having the maximum probability value as the segmentation and recognition result of the character strings continuously written by a user.

13. Apparatus for automatically segmenting and recognizing character strings continuously written by a user in a handwritten character processing system, wherein said handwritten character processing system records character strings continuously written by a user in strokes and associated timing information thereof, said apparatus comprising:

at least one processor operative to: (i) create a geometry model which describes geometric characteristics of stroke sequences of handwritten character strings and a language model which describes dependency among characters or words; (ii) determine potential segmentation schemes in the character strings continuously written by a user based on said associated timing information and said geometry model; (iii) recognize groups of strokes as defined by each of the potential segmentation schemes and computing a probability characterizing the exactness of the recognition result; (iv) correct the probability characterizing the exactness of the recognition result by said language model; and (v) select the recognition result having the maximum probability value and the corresponding segmentation scheme as the segmentation and recognition result of the character strings continuously written by a user.

* * * * *

UNITED STATES PATENT AND TRADEMARK OFFICE
CERTIFICATE OF CORRECTION

PATENT NO. : 6,665,436 B2
DATED : December 16, 2003
INVENTOR(S) : H. Su et al.

It is certified that error appears in the above-identified patent and that said Letters Patent is hereby corrected as shown below:

Column 3,
Line 29, "$$C^* = \arg\max_{\vec{c}} P_r(\vec{S}|\vec{C}) P_r(\vec{C})$$"

should be $$C^* = \arg\max_{\vec{C}} P_r(\vec{S}|\vec{C}) P_r(\vec{C})$$

Line 45, "$f_1, f_2, \ldots, f_N$" should be -- $f_1, f_2, \ldots, f_N$ -- and "$f_i$" should be -- $f_i$ --
Lines 48 and 49, "$c_1, C_2, \ldots, c_M$" should be -- $c_1, c_2, \ldots, c_M$ --
Line 53, "$b_o=0$" should be -- $b_0=0$ --

Column 4,

Line 30, "S" should be -- $\vec{S}$ --

Line 51, "J=1" should be -- $j = 1$ --

Column 5,
Line 10, "$C_j$" should be -- $c_j$ --

Signed and Sealed this

Twentieth Day of July, 2004

JON W. DUDAS
*Acting Director of the United States Patent and Trademark Office*